(12) United States Patent
Koyanagi et al.

(10) Patent No.: US 6,785,090 B2
(45) Date of Patent: Aug. 31, 2004

(54) DISK CLAMP FOR DISK RECORDING APPARATUS AND DISK RECORDING APPARATUS

(75) Inventors: Ichiroh Koyanagi, Yokohama (JP); Tatsuo Nakamoto, Sagamihara (JP); Kohichi Takeuchi, Shimotsuruma Yamato (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 225 days.

(21) Appl. No.: 10/035,467

(22) Filed: Oct. 23, 2001

(65) Prior Publication Data

US 2002/0071205 A1 Jun. 13, 2002

(30) Foreign Application Priority Data

Oct. 26, 2000 (JP) ........................................ 2000-326417

(51) Int. Cl.[7] .............................................. G11B 17/22
(52) U.S. Cl. .................................. 360/98.08; 360/99.12
(58) Field of Search ............................ 360/98.08, 99.12

(56) References Cited

U.S. PATENT DOCUMENTS

| | | | | |
|---|---|---|---|---|
| 4,945,432 A | * | 7/1990 | Matsudaira et al. ..... | 360/98.02 |
| 5,333,080 A | * | 7/1994 | Ridinger et al. ......... | 360/99.12 |
| 5,596,462 A | * | 1/1997 | Smith ....................... | 360/99.12 |
| 5,724,208 A | * | 3/1998 | Yahata ..................... | 360/98.01 |
| 5,760,999 A | * | 6/1998 | Yahata ..................... | 360/98.01 |
| 5,847,900 A | * | 12/1998 | Iwabuchi .................. | 360/98.08 |
| 5,969,902 A | * | 10/1999 | Okumura et al. ......... | 360/99.08 |
| 6,212,030 B1 | * | 4/2001 | Koriyama et al. ....... | 360/98.08 |
| 6,215,617 B1 | * | 4/2001 | Okumura et al. ........ | 360/99.12 |
| 6,282,054 B1 | * | 8/2001 | Luo .......................... | 360/98.08 |
| 6,285,525 B1 | * | 9/2001 | McCutcheon et al. ... | 360/98.08 |
| 6,456,455 B2 | * | 9/2002 | McCutcheon et al. ... | 360/98.08 |
| 6,558,582 B1 | * | 5/2003 | Hayasaki et al. ........ | 252/518.1 |
| 6,590,739 B2 | * | 7/2003 | Ng et al. .................. | 360/98.08 |
| 2001/0053041 A1 | * | 12/2001 | Ng et al. .................. | 360/98.08 |
| 2002/0167757 A1 | * | 11/2002 | McCutcheon et al. ... | 360/99.08 |

FOREIGN PATENT DOCUMENTS

| | | | | |
|---|---|---|---|---|
| JP | 01264679 A | * | 10/1989 | ........... G11B/23/03 |
| JP | 04222958 A | * | 8/1992 | ......... G11B/17/038 |
| JP | 06325454 A | * | 11/1994 | ......... G11B/17/038 |
| JP | 07296476 A | * | 11/1995 | ......... G11B/17/038 |
| JP | 08106712 A | * | 4/1996 | ........... G11B/19/20 |
| JP | 10172258 A | * | 6/1998 | ........... G11B/23/00 |
| JP | 10208346 A | * | 8/1998 | ......... G11B/17/038 |
| JP | 10222906 A | * | 8/1998 | ......... G11B/17/038 |
| JP | 10302375 A | * | 11/1998 | ........... G11B/19/02 |
| JP | 11126416 A | * | 5/1999 | ........... G11B/19/20 |
| JP | 2000163905 A | * | 6/2000 | ........... G11B/23/00 |
| JP | 2001181760 A | * | 7/2001 | ........... C22C/14/00 |
| JP | 2001-247357 A | | 9/2001 | |

* cited by examiner

*Primary Examiner*—William Klimowicz
(74) *Attorney, Agent, or Firm*—Robert B. Martin; Bracewell & Patterson, L.L.P.

(57) ABSTRACT

A disk clamp has a data position in a recording track that is resistant to positional deviations even after temperature cycling is conducted. The distribution of data positions can be centered in the vicinity of the center position. A disk top clamp and hub are made from materials that are stable in terms of chemical properties over a temperature range in which the disk recording apparatus is used and have such a coefficient of elasticity that a clamping force required to clamp the recording disks while the disk recording apparatus is in use can be obtained from the tightening force to tighten the screws. The material of the top clamp and the hub has a thermal expansion coefficient that is close to that of the recording disk.

14 Claims, 12 Drawing Sheets

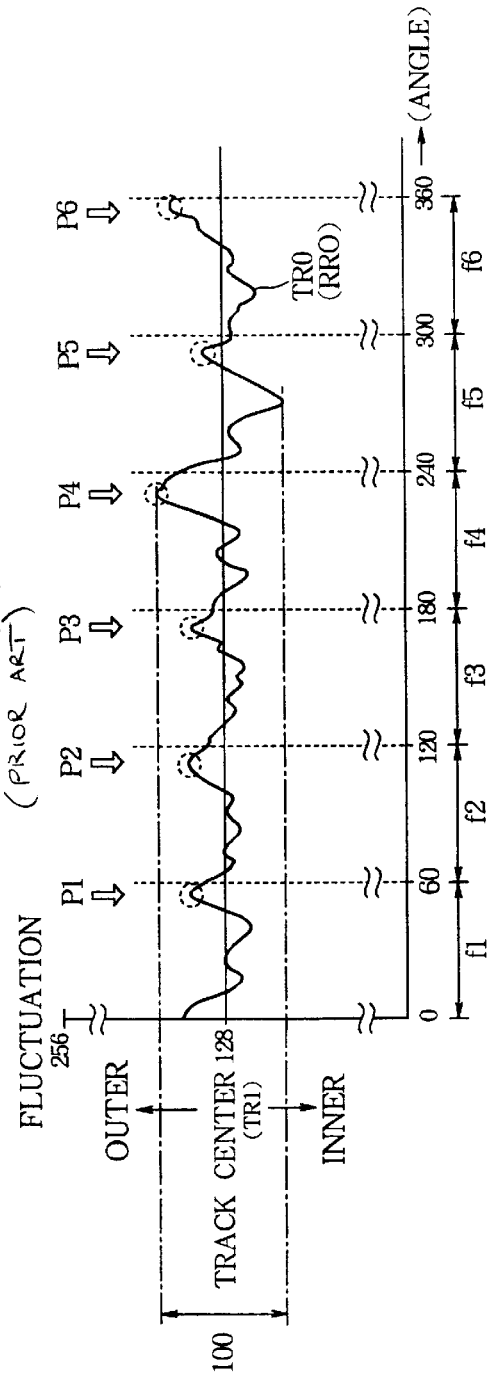
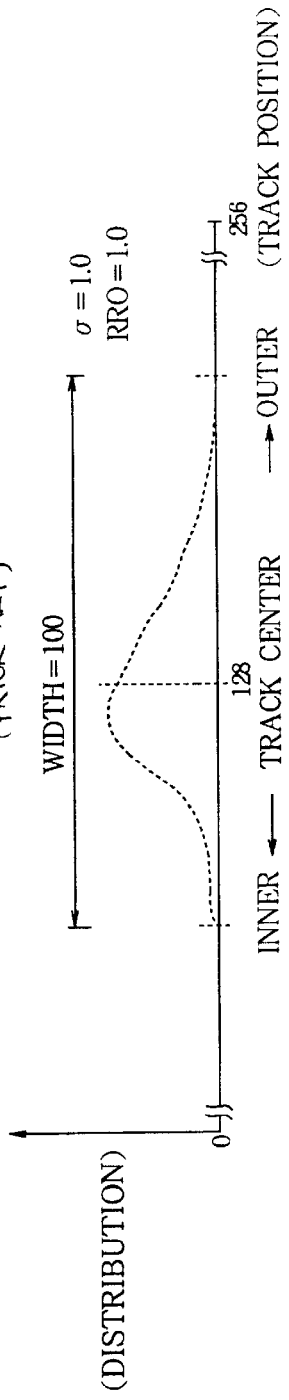

DISK CLAMP FOR DISK RECORDING APPARATUS AND DISK RECORDING APPARATUS

BACKGROUND OF THE INVENTION

1. Technical Field

The present invention relates to the structure of a disk clamp which rotatably and securely holds recording disks that rotate at a high speed in an disk recording apparatus. The disk clamp connects the disks to a spindle motor, which is a rotary drive.

2. Description of the Prior Art

A hard disk drive, which is an disk recording apparatus in which recording media is magnetic recording disks. The magnetic recording disks rotate at a high speed in an recording apparatus used in an information processing apparatus such as a computer. More than one magnetic recording disk (hereafter referred to as a recording disk) rotates at a high speed and writes or reads information data by means of magnetic heads individually disposed for the top and bottom faces of the recording disks.

A recording disk for a hard disk drive is rotated by a spindle motor, which is a rotary drive. A recording disk rotates at a speed as high as a few thousand revolutions per minute. Therefore, a disk clamp that secures each recording disk to the spindle shaft of the spindle motor must have a structure and strength for holding each recording disk.

A hard disk drive of 3.5-inch type, for instance, may not change its dimensions but is demanded to increase the storage capacity by several tens of percent or greater each year, and is demanded to reduce the thickness and the other outer dimensions as much as possible to keep up with the miniaturization of internal units or the like. Accordingly, disk clamp has also been desired to reduce the thickness and the other outer dimensions as much as possible. But a certain physical dimensions in the disk clamp are required to securely hold the recording disks and stand their high-speed revolutions, so that it is difficult to make the current dimensions smaller or slimmer.

On the other hand, the recording disk, like a compact disc for instance, on which recording is performed with magnetically, in that it has the disc shape and a hole at its center. And the recording disk has a large number of magnetic recording tracks which are concentrically formed on its surfaces. To satisfy the recording density which has been increasing year after year, the recording disk is required to have a highly flatness level. The surfaces of a glass substrate can be easily smoothed out. So, the glass substrate become more popular than the conventional aluminum substrate in recent years.

FIG. 10 is a cross-sectional view showing the structure of a conventional disk clamp which holds recording disks using three glass substrates. The disk clamp shown in FIG. 10 holds three recording disks 17(A), 17(B), and 17(C) together from the top and bottom. The member that holds the recording disk 17(C) from the bottom is the stainless steel hub 23, and the member that holds the recording disk 17(A) from the top is the stainless steel top clamp 21. Stainless steel is one of materials that are stable in terms of chemical properties over the whole temperature range in which the disk recording apparatus (hard disk drive) would be used. And the stainless steel has such a coefficient of elasticity that a clamping force required to clamp the recording disks 17(A) to 17(C) while the disk recording apparatus(describe later) is in use. The clamping force can be obtained from the tightening force to tighten the screws 22. The hub 23 is secured to the spindle shaft 18, which is the axis of rotation of the spindle motor 25. The top clamp 21 is secured by tightening the screws 22 into the hub 23. In the spaces among the three recording disks 17(A), 17(B), and 17(C), the ring-shaped spacers 24 formed by a ceramic material are inserted. The thermal expansion coefficient of the spacers 24 is close to that of the glass substrate.

The radius of the cylindrical portion 23a of the hub 23 that goes through the center holes of the recording disks 17(A), 17(B), and 17(C) is smaller than the radius of the perimetric portion 23b which holds the recording disk 17(C) from the bottom. Likewise, the radius at which screwing positions 21a are disposed in the top clamp 21 is smaller than the radius of the perimetric portion 21b which holds the recording disk 17(A) from the top.

The screwing positions 21a and the perimetric portion 21b of the top clamp 21 are integrally formed in a stainless steel member, and the thickness of the connecting portion 21c is L1. The cylindrical portion 23a and the perimetric portion 23b of the hub 23 are also integrally formed in a stainless steel member, and the thickness of the connecting portion 23c is L2.

FIG. 11 illustrates that the tightening force by the screws 22 for securing the recording disks 17 shown in FIG. 10 is transferred through the disk clamp up to the perimetric portion 21b or 23b. The tightening force FC1 of the screws 22 travels through the cylindrical portion 23a of the hub 23 and works to press the cylindrical portion 23a and the screwing position 21a in a direction to close each other, as represented by the arrows in FIG. 11. The tightening force FC1 also travels through the connecting portion 21c of the top clamp 21 up to the perimetric portion 21b, but the magnitude of this force varies with the distance L3, coefficient of elasticity (Young's modulus), and thickness L1. For instance, the tightening force FC2 in the perimetric portion 21b grows weaker with increase in distance L3, with decrease in coefficient of elasticity, or with decrease in thickness L1. The tightening force traveling through the connecting portion 21c is defined as transfer force M1. The magnitude of the transfer force M1 of the connecting portion 21c is proportional to the thickness L1 of the connecting portion 21c if the material has uniform properties, like stainless steel. The transfer force M1 traveling in this way is transferred by the perimetric portion 21b to the clamp portion 17a of the recording disk 17(A) and combined with the force transferred by the perimetric portion 23b of the hub 23 (described later), to form the tightening force FC2, which presses the clamp portion 17a from the top.

Likewise, the tightening force FC1 which travels through the cylindrical portion 23a of the hub 23 is transferred through the connecting portion 23c by distance L3 up to the perimetric portion 23b. The transfer force through the connecting portion 23c is defined as M2. The transfer force M2 varies with the distance L3, coefficient of elasticity (Young's modulus), and thickness L2. And the transfer force M2 is proportional to the thickness L2 of the connecting portion 23c, for instance, if the material has uniform properties. The transfer force M2 traveling in this way is transferred by the perimetric portion 23b to the clamp portion 17c of the recording disk 17(C). And the transfer force M2 is combined with the force from the perimetric portion 21b of the top clamp 21, which was described earlier, to form the tightening force FC2. The FC2 presses the clamp portion 17b from the bottom.

The tightening force FC2, which is the resultant of the force pressing the clamp portion 17a of the recording disk 17(A) from the top and the force pressing the clamp portion 17b of the recording disk 17(C) from the bottom, is transferred through the recording disks 17(A), 17(B), and 17(C) and the spacers 24 among the recording disks 17(A), 17(B), and 17(C) and secures the recording disks. The spacers 24 are inserted to maintain spaces between the recording disks 17(A) and 17(B) and between 17(B) and 17(C) and are made of ceramics of which thermal expansion coefficient is almost the same as that of the recording disks 17.

The hard disk drive is generally used in an environment of room temperature (about 20 to 25 degrees Celsius), and the internal temperature rises to about 50 to 60 degrees Celsius by the heat generated by the rotation of the spindle motor 25 and the recording disks 17, the driving of the voice coil motor, and the like. Room temperature may also decrease to about 0 degree Celsius. Therefore, the hard disk drive would generally be placed in an environment of temperature cycling of about 0 to 60 degrees Celsius, and the recording apparatus would be used in the temperature range. The temperature range becomes the whole temperature range of the recording apparatus. In FIG. 11, the direction of the largest thermal expansion caused by the temperature rise in each recording disk 17 is indicated as TE1. In the temperature cycling environment, thermal expansion and contraction is large in the direction TE1.

3. Problems to be Solved by the Invention

Because the thermal expansion coefficient of stainless steel is approximately is different from the thermal expansion coefficient of glass substrate, the width of expansion or contraction by thermal expansion of the perimetric portion 21b is different from the width of expansion or contraction by thermal expansion of the clamp portion 17a of the recording disk 17 in the temperature cycling environment. As a result, if the temperature rises after the glass substrate is mounted on the disk clamp, the perimetric portion 21b having a large thermal expansion coefficient would shift the point of contact with the clamp portion 17a from the first position of contact toward the radially outer side of the recording disk 17, so that a radially outward stress would be applied to the recording disk 17. Then, if the temperature decreases to room temperature, the perimetric portion 21b would return the point of contact with the clamp portion 17a to the original position of contact, so that a radially inward stress would be applied to the recording disk 17.

However, the top clamp 21 and hub 23 are secured by the screws 22, as described above, and the number of positions secured by the screws 22 are limited, so that when the whole perimetric portion 21b of the top clamp 21 is viewed, the distance L3 between a position of the perimetric portion 21b and its nearest screw 22 depends on the position. Supposing that the position of the screw 22 is a fixed center and that the perimetric portion 21b is a point of action for securing the recording disk the distance between the center and the point of action depends on the position in the perimetric portion 21b. A difference in distance results in a difference in the force applied to the point of action (tightening force), as described above.

Stainless steel used for the disk clamps shown in FIGS. 10 and 11 has so large a coefficient of elasticity (Young's modulus) and so high an elastic limit (almost equal to the proportional limit) that the whole perimetric portion 21b of the top clamp 21 can be kept relatively uniform even if it is secured by the screws 22. However, the pressing force of the perimetric portion 21b is slightly different, depending on the distance from the screws 22, as described above. The difference causes this problem: After temperature cycling is conducted as described above, the recording disk 17(A) or 17(C) that thermally expanded in the direction TE1 is likely to return to the original position of contact with the perimetric portion 21b or 23b, in positions far from the screws 22, and the recording disk 17(A) or 17(C) that thermally expanded in the direction TE1 is not likely to return to the original position of contact with the perimetric portion 21b or 23b, in positions near the screws 22.

The recording disks 17 of the hard disk drive have recording tracks formed beforehand in the magnetic recording faces and are secured to the spindle shaft by the disk clamp (top clamp 21 and hub 23). Therefore, after temperature cycling is carried out, the recording tracks in the magnetic recording faces of the recording disk 17(A) or 17(C) are likely to return to the original positions of contact with the perimetric portion 21b or 23b in some places and are not in the other places, as described above. That is, the recording tracks that were almost round about the spindle shaft when they were formed beforehand in the magnetic recording faces of the recording disk 17 would become wavy circles affected by differences in distance from the screws 22.

FIG. 12(a) shows a record of fluctuations in data position of a single full track within the width of a single track of the recording tracks on the recording disk (A) after a temperature cycling test is carried out with a disk clamp with six screws 22, and the value of this PES (position error signal) is set as a relative reference value of 100. FIG. 12(b) shows the distribution of data positions within the track width of a single full recording track shown in FIG. 12(a), and the standard deviation is set as a relative reference value of 1.0, and the corresponding value of RRO (repeatable run out) is also set as 1.0.

A single cycle of the temperature cycling test is, for instance, to raise the ambient temperature of a test object from 25 to 60 degrees Celsius, back to 25 degrees Celsius, then down to 0 degree Celsius, and back again to 25 degrees Celsius, for instance, and the test is carried out to cover the whole temperature range in which the recording apparatus would be used as described above.

In FIGS. 12(a) and 12(b), the width of a single track is divided into 256 parts, and the center of the recording track corresponds to the position of 128 on the vertical axis in FIG. 12(a) or the position of 128 on the horizontal axis in FIG. 12(b). When the disks are first secured by the disk clamp, all data positions in a single full recording track formed in the recording disk 17 almost match the position of 128 in the figures described above or remain within a very narrow range around the position, decreasing the values of standard deviation and RRO mentioned above.

As shown in FIG. 12(a), the data positions of a full recording track after temperature cycling have six peaks P1 to P6 of positional deviation. Because the peaks P1 to P6 of positional deviation occur in almost identical positions in the six individual cycles f1 to f6 of 60 degrees, it is apparent that the positional deviations occur depending on the angle. In the example shown in FIG. 12, the six screws 22 are placed at intervals of 60 degrees in the range of 360 degrees, so that it is clear that the peaks PI to P6 of the positional deviation correspond to the positions of the screws 22. Therefore, it is found that the conventional stainless steel disk clamp (top clamp 21 and hub 23) causes the peaks P1 to P6 of positional deviation in data position of a recording track to occur after a temperature cycling test is executed, corresponding to the positions of the screws 22.

If the disk clamp shown in FIG. 12(a) is used, the extension of the data position distribution corresponds to a relative reference value of 100 within the 256 divisions of a single track, as shown in FIG. 12(b). Some data positions in a recording track such as the peaks P1 to P6 are largely deviated from the position of 128, which is the center of the track.

To write or read data in a data position largely deviated from the center of track, the servo and other technologies must be used to move the head. Sudden movements of the head, however, are not desirable because there is a danger of unsuccessful data read or write, even if the servo and other technologies are used. For stable read or write by the head, data positions should be centered in and normally distributed within a narrow range about the center position of 128. In the example shown in FIG. 12(b), the distribution of data positions is spread to the extent very far from the center position of 128, so that it would be hard to read or write data with stability.

The present invention has been provided to ease or solve the problems as described above, with an object of providing such a disk clamp that data positions in recording tracks are resistant to positional deviation even after temperature cycling is conducted and that the distribution of data positions is centered in the vicinity of the center.

SUMMARY OF THE INVENTION

To solve the above problem, a disk clamp for information recording disk apparatus of the present invention is a disk clamp which secures recording disks with circumferential recording tracks formed beforehand on disk-shaped glass substrates to the spindle shaft in the information recording disk apparatus, and comprises at least a cylindrical hub secured to the spindle shaft, a top clamp which holds from the top the recording disks concentrically disposed on the hub, and screws which secure the top clamp to the hub; and the top clamp and the hub are made of materials that are stable in terms of chemical properties over the whole temperature range in which the disk recording apparatus would be used and have such a coefficient of elasticity that a clamping force required to clamp the recording disks while the disk recording apparatus is in use can be obtained from the tightening force to secure the screws; and the material of either the top clamp or the hub at least has a thermal expansion coefficient close to that of the glass substrate.

In another aspect of the invented disk clamp is made by titanium as the main material at least either one of the top clamp or the hub.

In another aspect of the invented disk clamp, when the main material of just either the top clamp or the hub is made by titanium, the material of the other is made by stainless steel.

In another aspect of the invented disk clamp, when a plurality of glass substrates are provided, a ring-shaped spacer made of a ceramic material of which thermal expansion coefficient is close that of the glass substrate is inserted between the glass substrates.

In another aspect of the invented disk clamp for information recording disk apparatus of the present invention is a disk clamp which secures recording disks with circumferential recording tracks formed beforehand on disk-shaped glass substrates to the spindle shaft in the information recording disk apparatus, and comprises at least a cylindrical hub secured to the spindle shaft, a top clamp which holds from the top the recording disks concentrically disposed on the hub, screws which secure the top clamp to the hub, and a ring-shaped thermal strain buffer which is inserted into the portion of contact between the hub or top clamp at least and the recording disk; and the thermal strain buffer is made a material that is stable in terms of chemical properties over the whole temperature range in which the disk recording apparatus would be used and has a thermal expansion coefficient close to that of the glass substrate.

In another aspect of the invented disk clamp, the main material of the thermal strain buffer is made by titanium.

In another aspect of the invented disk clamp, the thermal strain buffer is formed by punching a ring out of a thin titanium sheet evenly spread by forging or rolling.

In another aspect of the invented disk clamp, the thickness of the thermal strain buffer is 0.2 mm or smaller.

In another aspect of the invented disk clamp, alpha-type titanium is used for the thermal strain buffer.

BRIEF DESCRIPTION OF THE DRAWINGS

FIG. 12(a) shows a record of fluctuations in data position in a single full recording track after a temperature cycling test is carried out with a disk clamp having six screws.

FIG. 12(b) shows the distribution of data positions in a single full recording track shown in FIG. 12(a) within the width of track.

DETAILED DESCRIPTION OF THE PREFERRED EMBODIMENT

Figure 1:
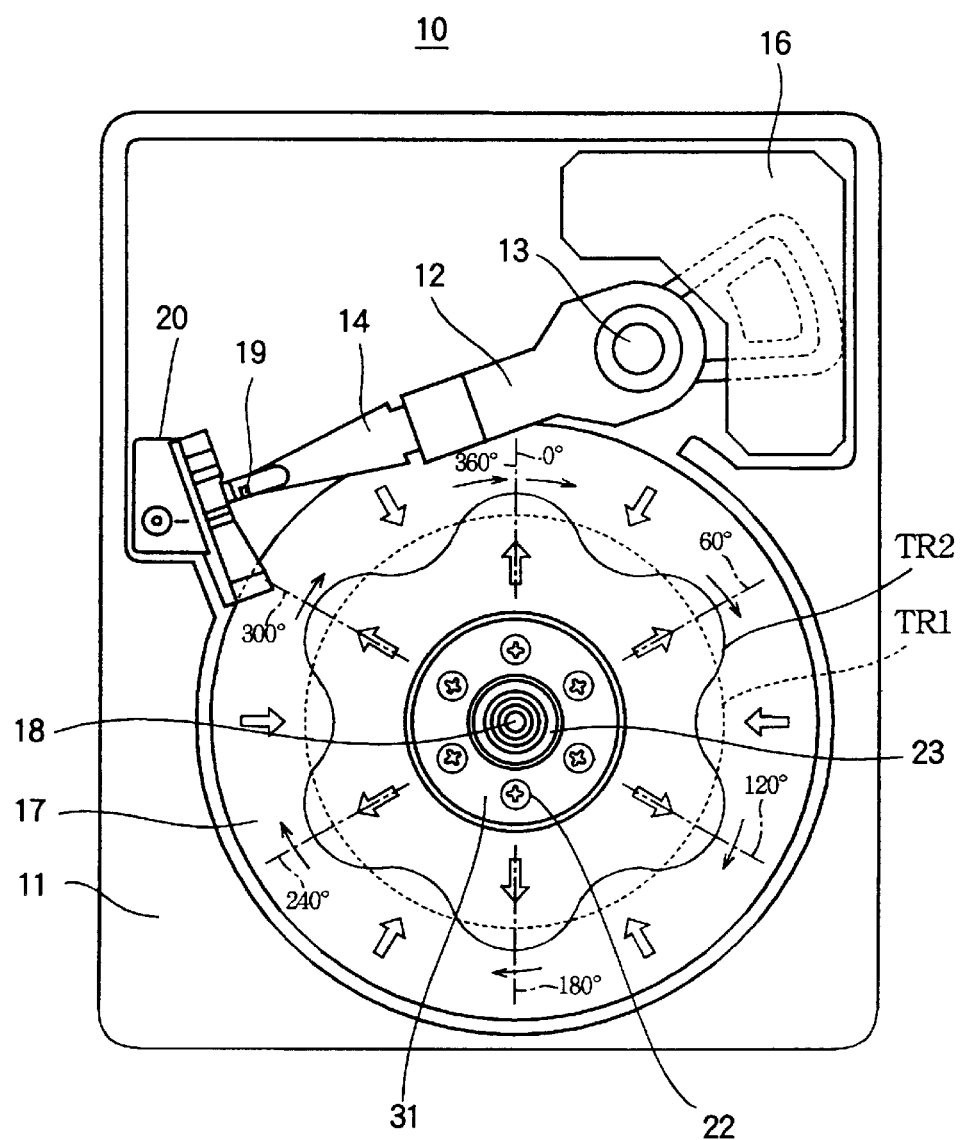
FIG. 1 is a top view showing a magnetic recording disk apparatus having the disk clamp of the first embodiment of the present invention.

The present invention will now be described on the bases of illustrated embodiments. FIG. 1 is a top view of a magnetic recording disk apparatus equipped with a disk clamp in accordance with a first embodiment of the present invention. The magnetic recording disk apparatus 10 shown in FIG. 1 has the recording disks 17, pivotal actuator assembly 12, voice coil motor 16, and ramp 20 in its housing 11, forming a airtight space inside. The recording disks 17 are made of a plurality of disks with magnetic recording layers provided on their top and bottom faces, stacked and secured to the spindle shaft 18, and the individual disks are turned together with the spindle shaft 18 by the spindle motor, which is not shown in the figure. In the following descriptions, for ease of explanation, the spindle motor is described as the rotational shaft type which rotates the spindle shaft 18, but the stationary shaft type which does not rotate the spindle shaft may be used in the following embodiments.

The spindle shaft 18 is also provided with the hub 23 so that the recording disks 17 are secured, and the recording disks 17 are concentrically disposed on the top or side of the hub 23. The recording disks 17 are clamped by the top clamp 31 placed at the top and the hub 23. The top clamp 31 and the hub 23 are secured by the six screws 22, which secure the recording disks 17 to the spindle shaft 18. The screws 22 are disposed at intervals of 60 degrees, dividing the angle of 360 degrees of the circumference of the recording disk 17 into six parts.

The top face and bottom face of each disk of the recording disks 17 are individually used as information recording faces, and a individual magnetic head, which is not shown in the figure, is used for each face. The actuator assembly 12 has suspension arms 14, the number of which is the same as the number of information recording faces, stacked and supported by the pivot shaft 13. Each suspension arm 14 has the slider 19 at its tip. The slider 19 has a magnetic head that runs along the top or bottom information recording face of each disk.

The actuator assembly 12 is driven by the voice coil motor 16 to pivot about the pivot shaft 13, and loads the slider 19 having the magnetic head onto a face of the recording disk 17 or unloads the slider 19 to the ramp 20. The suspension arm 14 is made of an elastic material, and a bias force is exerted in such a direction that the slider 19 provided on each arm approaches the corresponding disk surface among the recording disks 17. The slider 19 levitates to a constant height from the surface of the rotating recording disk 17 when the levitating force given to the slider 19 by the rotation of the recording disks 17 and the elasticity of the suspension arm 14 are in balance.

The recording disk 17 is provided with a number of concentric recording tracks TR1 in advance. The recording track TR2 is provided to represent the directions of fluctuations of data position in a track caused by temperature cycling, for reference purposes, and does not represent the fluctuations of data position in this embodiment.

Figure 2:
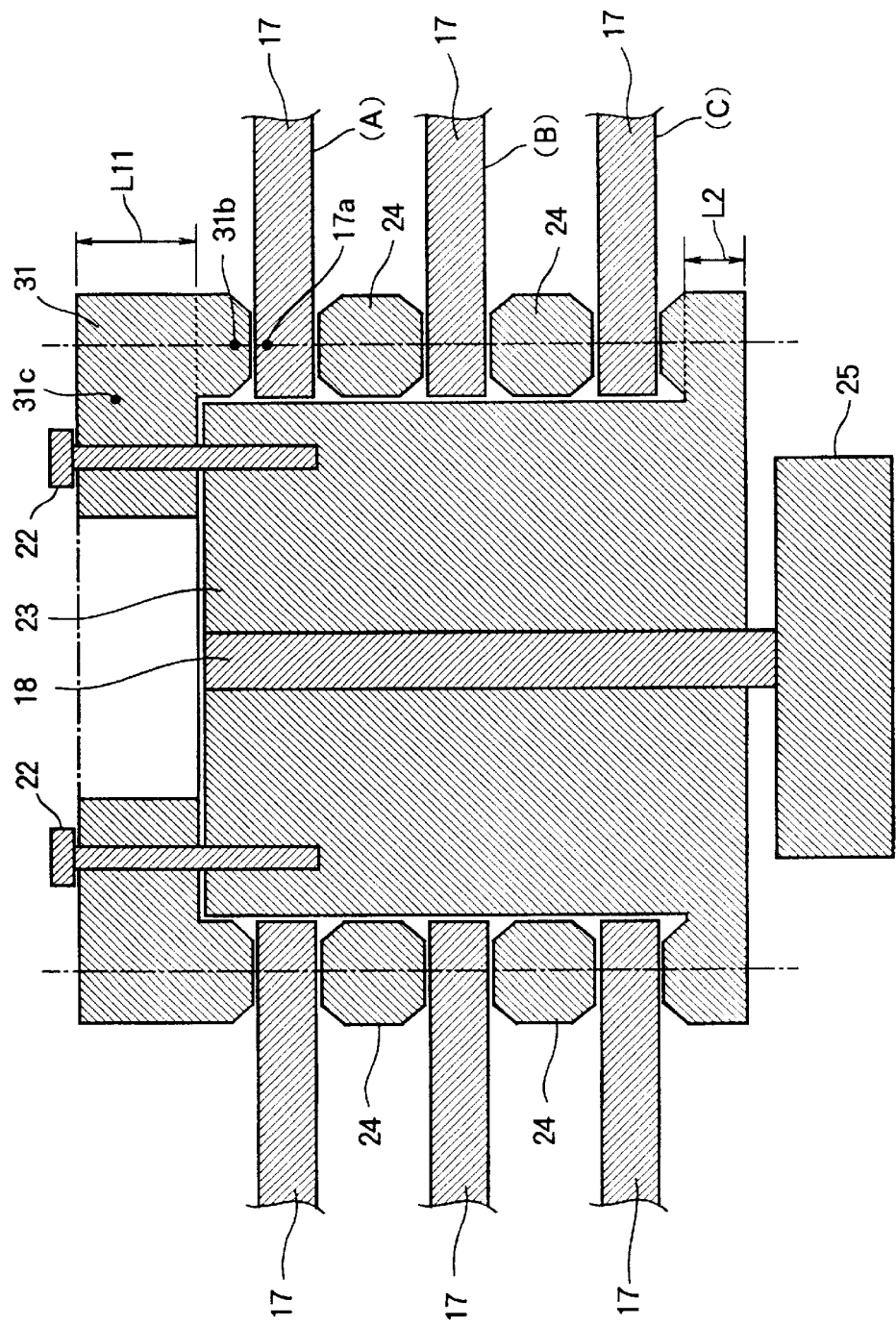
FIG. 2 is a sectional view of the disk clamp shown in FIG. 1.
Figure 10:
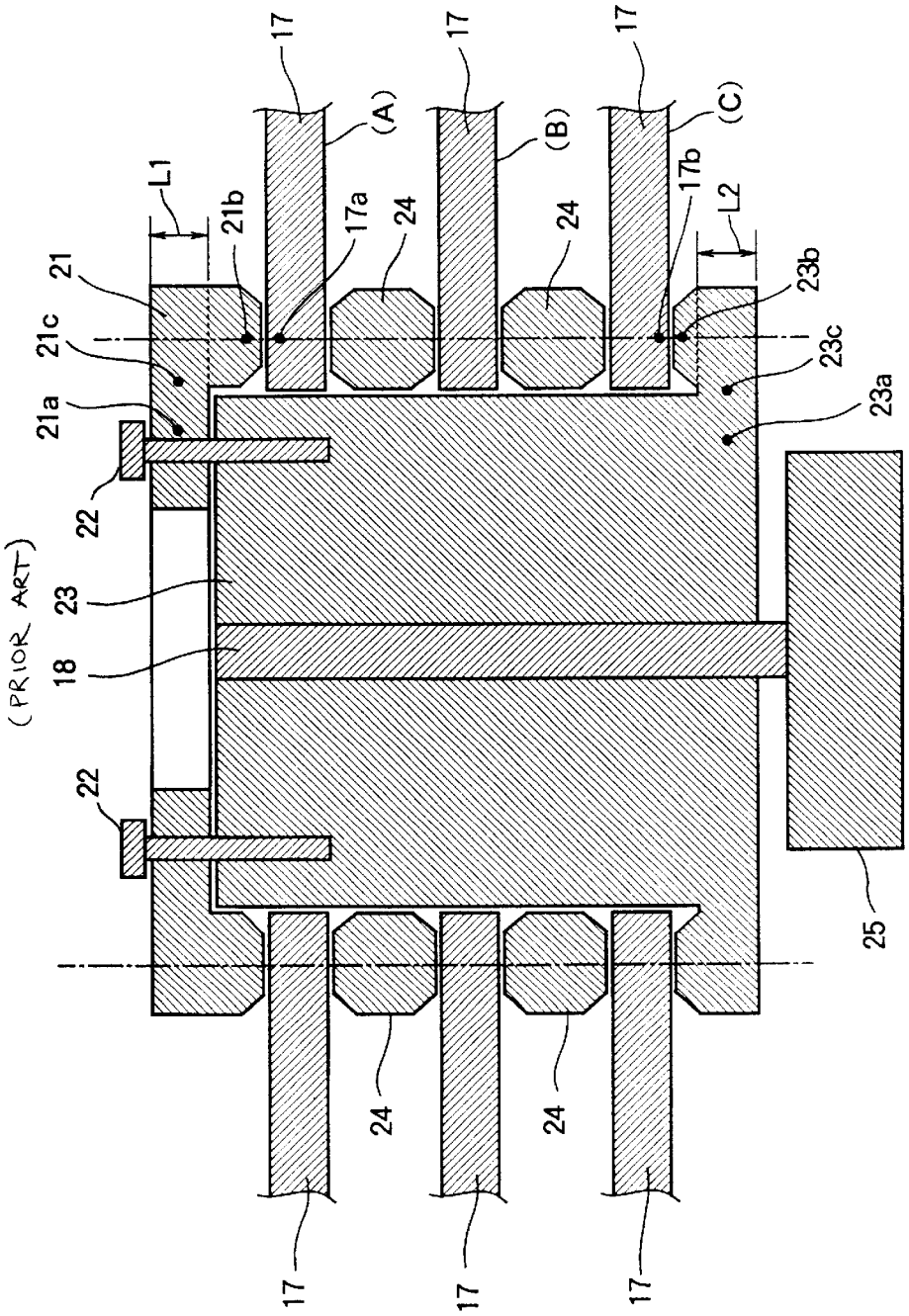
FIG. 10 is a sectional view showing the structure of the conventional disk clamp which holds three recording disks using glass substrates.
Figure 11:
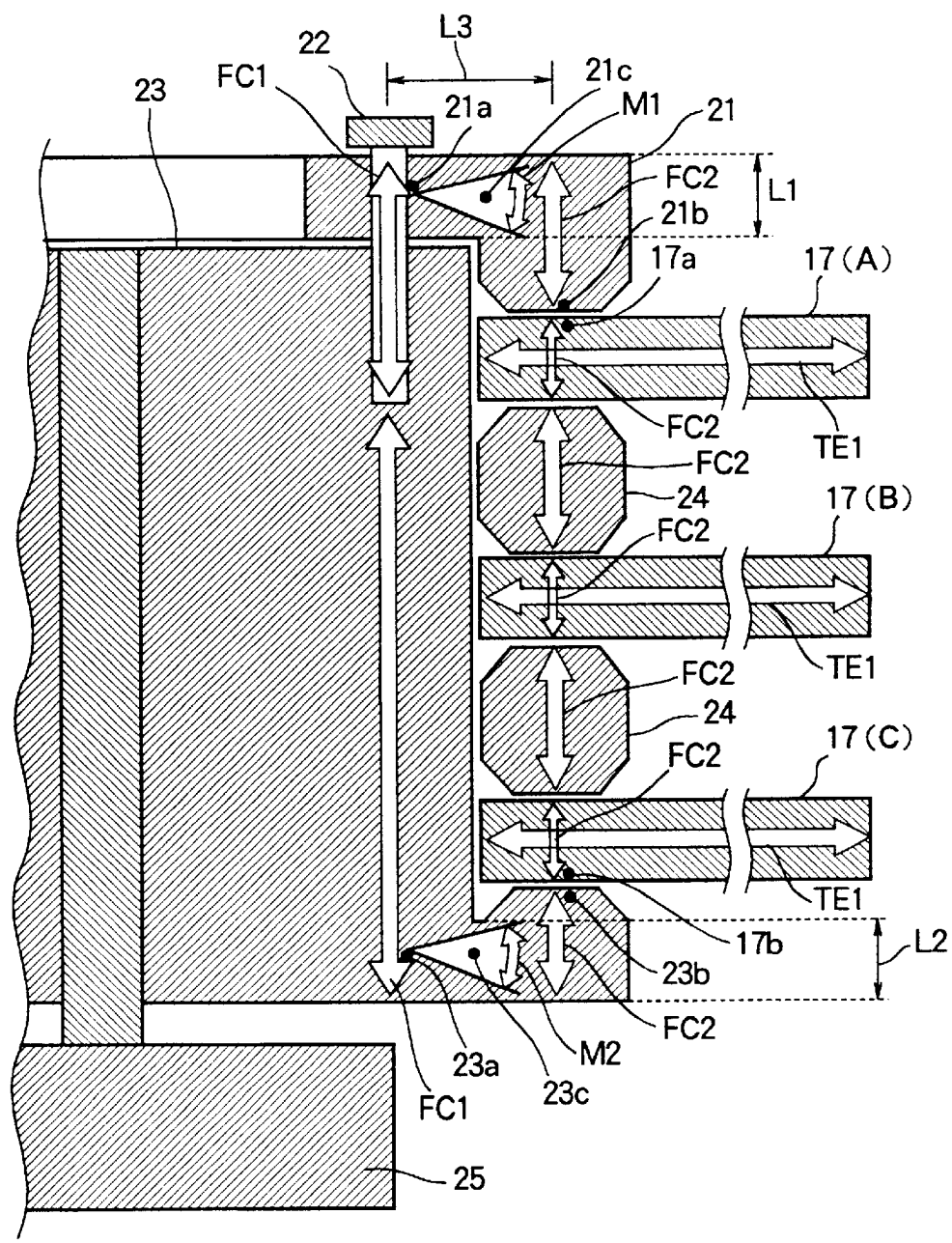
FIG. 11 illustrates that the tightening force by the screws for securing the recording disks shown in FIG. 10 is transferred through the disk clamp up to the perimetric portion.

FIG. 2 is a cross-sectional view of the disk clamp shown in FIG. 1. A main difference between the disk clamp of this embodiment shown in FIG. 2 and the conventional disk clamp shown in FIG. 10 is that the top clamp 31 is not made of stainless steel but is made of a titanium material of which thermal expansion coefficient is close to the thermal expansion coefficient of the glass substrate of the recording disk 17. The titanium material of this embodiment is just required to contain titanium as its main material and may also be a titanium alloy instead of pure titanium. The titanium material of this embodiment has a thermal expansion coefficient close to the thermal expansion coefficient of glass substrate. The thermal expansion coefficient of pure titanium is typically slightly less than that of a titanium alloy, so that a titanium material having almost the same thermal expansion coefficient as the glass substrate can be selected.

The titanium material is one of materials that are stable in terms of chemical properties over the whole temperature range in which the disk recording apparatus (hard disk drive) would be used, and is generally divided into three types, which are alpha type titanium alloy containing pure titanium and relatively small amounts of metallic additives, beta type titanium alloy containing relatively large amounts of metallic additives, and alpha+beta type titanium alloy being a two-phase alloy; and any type of alloy described above can be used for this embodiment if it satisfies such a condition that the thermal expansion coefficient is close to the thermal expansion coefficient of the glass substrate.

Depending on the percentage composition of materials other than titanium, the thermal expansion coefficient of the titanium alloy of this embodiment may become closer to the thermal expansion coefficient of the recording disk 17, and the coefficient of elasticity (Young's modulus) may change so that the recording disks 17 can be clamped by a thinner material. Because the alpha type titanium alloy has almost the same thermal expansion coefficient as the glass substrate and entails low cost, the alpha type titanium alloy is suitable for use in this embodiment. Especially, in terms of cost, pure titanium is most inexpensive among titanium alloys and lends itself to use for this embodiment.

If a beta type titanium alloy such as the 15-3-3-3 type is used, for instance, anisotropy is lost, which is different from an application of the alpha type titanium alloy, eliminating the difference in linear expansion coefficient between the rolling direction of the raw materials and an orthogonal direction, so that the amounts of variations in expansion coefficient among individual disk clamps can be reduced. Experiments conducted by the inventor have shown that the amount of change in PES decreases especially on the low temperature side.

If an alpha+beta type titanium alloy is used, the same effect can be expected because its physical properties and the price are almost the same as those of the alpha type titanium alloy.

Any titanium alloy is more or less inferior to stainless steel in terms of coefficient of elasticity. Accordingly, the material requires a greater thickness to transfer the same force for clamping the recording disks 17. For instance, if the recording disks 17 rotate at a high speed, the thickness L11 of the connecting portion 31c must be greater than the thickness L1 of the connecting portion 21c shown in FIG. 10 by an amount required to secure the recording disks 17. By increasing the thickness L11 of the connecting portion 31c, the titanium material can be used to secure the recording disks 17 in the same way as the stainless steel.

Because the top clamp 31 of this embodiment uses a titanium material as described above and because the thermal expansion coefficient of the titanium material is close to the thermal expansion coefficient of the glass substrate, the amounts of expansion and contraction of the perimetric portion 31b and the clamp portion 17a of the recording disk 17(A) due to thermal expansion in temperature cycling are close. In other words, because the perimetric portion 31b and clamp portion 17a expand and contract without changing the position of contact, it is likely that the original position of contact is restored when the raised temperature lowers to room temperature. Therefore, differences in distance from the screws 22 will not result in such differences that the data position is likely to return to the original position of contact in some locations and is not in some other locations after temperature cycling is conducted, and the data position will evenly return to the original position of contact in any location.

Figure 3:
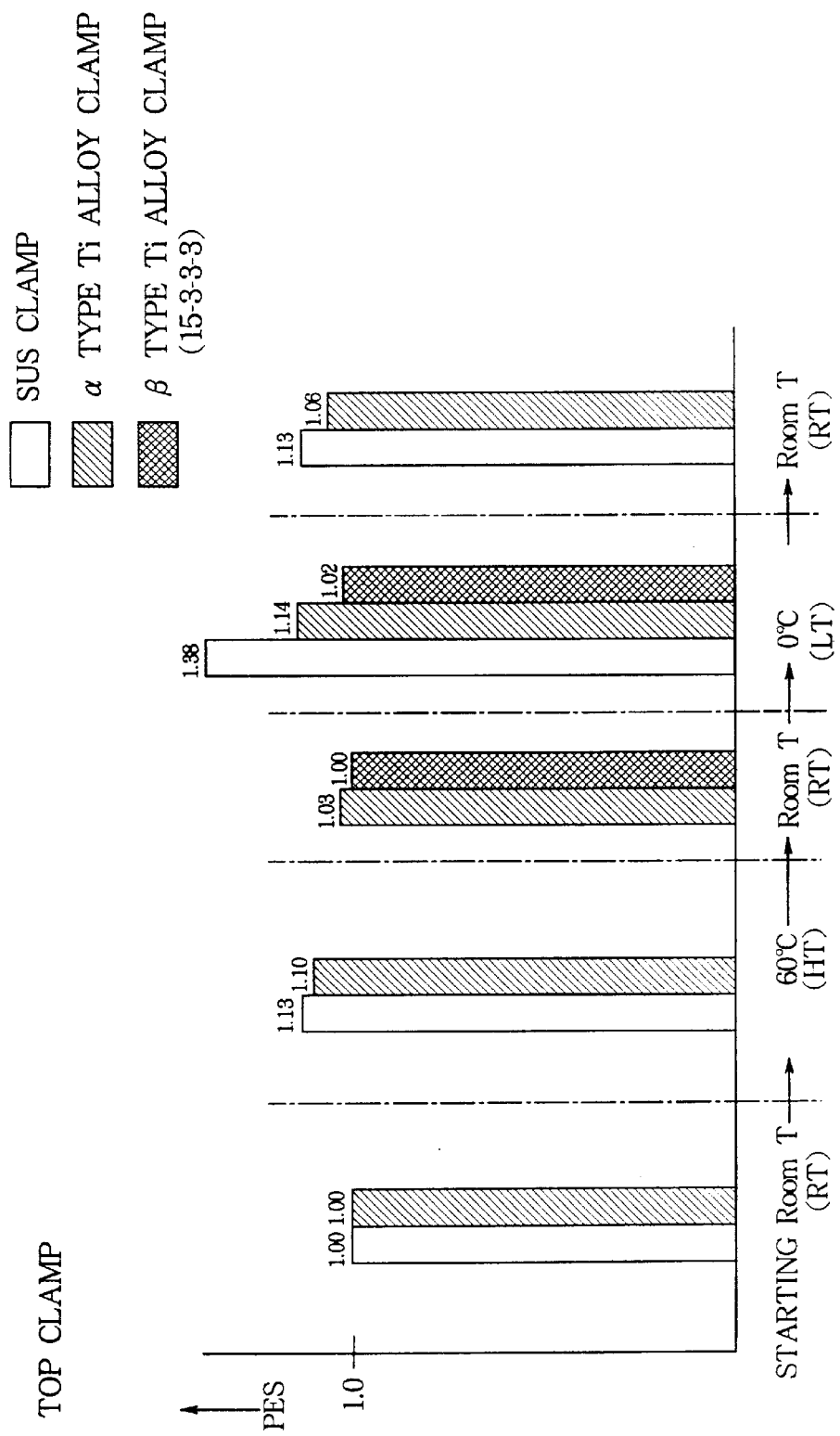
FIG. 3 shows the PES values of the disk clamp shown in FIG. 1, obtained by experiments.

Experiments conducted to confirm the description given above by the inventor have shown in FIG. 3 that the alpha type titanium alloy has a smaller amount of change in the relative value of PES after temperature cycling than the stainless steel and that the beta type titanium alloy has a further smaller amount of change in the relative value of PES than the alpha type titanium alloy.

Now, the other materials of which thermal expansion coefficient is close to the thermal expansion coefficient of the glass substrate will next be described. No other metals or alloys satisfy the conditions that the chemical properties are stable in the range of room temperature to at least about 60 degrees Celsius, that the coefficient of elasticity (Young's modulus) is sufficient for transferring the force for clamping the recording disks 17, and that the thermal expansion coefficient is close to the thermal expansion coefficient of the glass substrate. Many alloys having an appropriate thermal expansion coefficient, for instance, have a poor coefficient of elasticity which has would cause plastic deformation, and many other alloys having an appropriate coefficient of elasticity have a too large thermal expansion coefficient. Generally speaking, metallic materials except gold or titanium are vulnerable to changes in physical properties including chemical changes such as oxidation. Therefore, the metallic alloys other than titanium that are known to be in existence would not be suitable for use in this embodiment. The ceramic materials such as the one used for the spacer 24 can have a thermal expansion coefficient close to that of the recording disk 17 and are stable in terms of chemical properties, but the elastic limit is low, so that fracture will occur when the tightening force by the screws is being transferred as the clamping force for the recording disks 17. Therefore, the ceramic material would not be suitable for use in this embodiment, either.

As has been described above, because the top clamp of the disk clamp of this embodiment is made of a titanium material having a thermal expansion coefficient close to that of the glass substrate, the data position in a recording track on the side of the clamp portion 17a on the recording disk 17(A) can be resistant to positional deviations even after temperature cycling is conducted, and the distribution of data positions can be centered in the vicinity of the center position. Because the distribution of data positions can be centered in the vicinity of the center position, the head will not be moved suddenly, eliminating the danger of unsuccessful data read or write and enabling stable read and write by the head.

Figure 4:
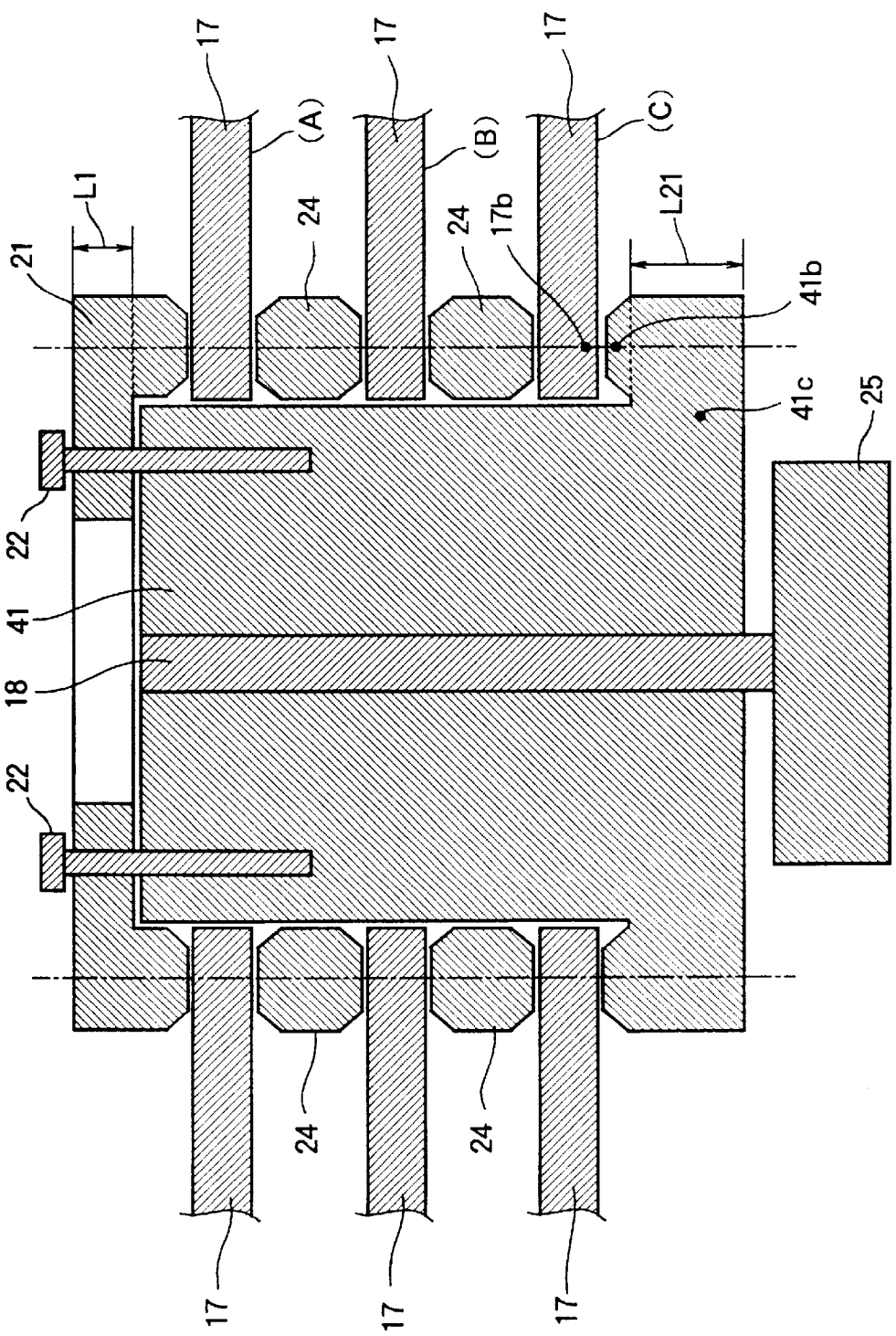
FIG. 4 is a sectional view of the disk clamp of a second embodiment of the invention.

FIG. 4 is a cross-sectional view of the disk clamp of a second embodiment of the present invention. A main difference between the disk clamp of this embodiment shown in FIG. 4 and the disk clamp of the first embodiment shown in FIG. 2 is that the hub 41 is not made of stainless steel but made of a titanium material of which thermal expansion coefficient is close to the thermal expansion coefficient of the glass substrate of the recording disk 17 and that the conventional stainless steel top clamp 21 as shown in FIG. 10 is used as the top clamp. The titanium material used in this embodiment is similar to the titanium material used in the previous embodiments.

The titanium material is more or less inferior to the stainless steel in terms of coefficient of elasticity, but by making the thickness L21 of the connecting portion 41c of the hub 41 greater than the thickness L2 of the connecting portion 23c shown in FIG. 10 by the amount required to secure the recording disks 17, as in the first embodiment, the titanium material can be used to secure the recording disks 17 in the same way as the stainless steel is used.

Because the hub 41 of this embodiment uses the titanium material of which thermal expansion coefficient is close to the thermal expansion coefficient of the glass substrate, as in the first embodiment, the perimetric portion 41b and clamp portion 17b are likely to return to the original positions of contact when the raised temperature returns to room temperature. Differences in distance from the screws 22 will not result in such differences that the data position is likely to return to the original position of contact in some locations and is not in some other locations after temperature cycling test is conducted, and the data position will evenly return to the original position of contact in any location.

As has been described above, because the hub of the disk clamp of this embodiment is made of a titanium material having a thermal expansion coefficient close to that of the glass substrate, the data position in a recording track on the side of the clamp portion 17b on the recording disk 17(C) can be resistant to positional deviations even after temperature cycling is conducted, and the distribution of data positions can be centered in the vicinity of the center position. Because the distribution of data positions can be centered in the vicinity of the center position, the head will not be moved suddenly, eliminating the danger of unsuccessful data read or write and enabling stable read and write by the head.

Figure 5:
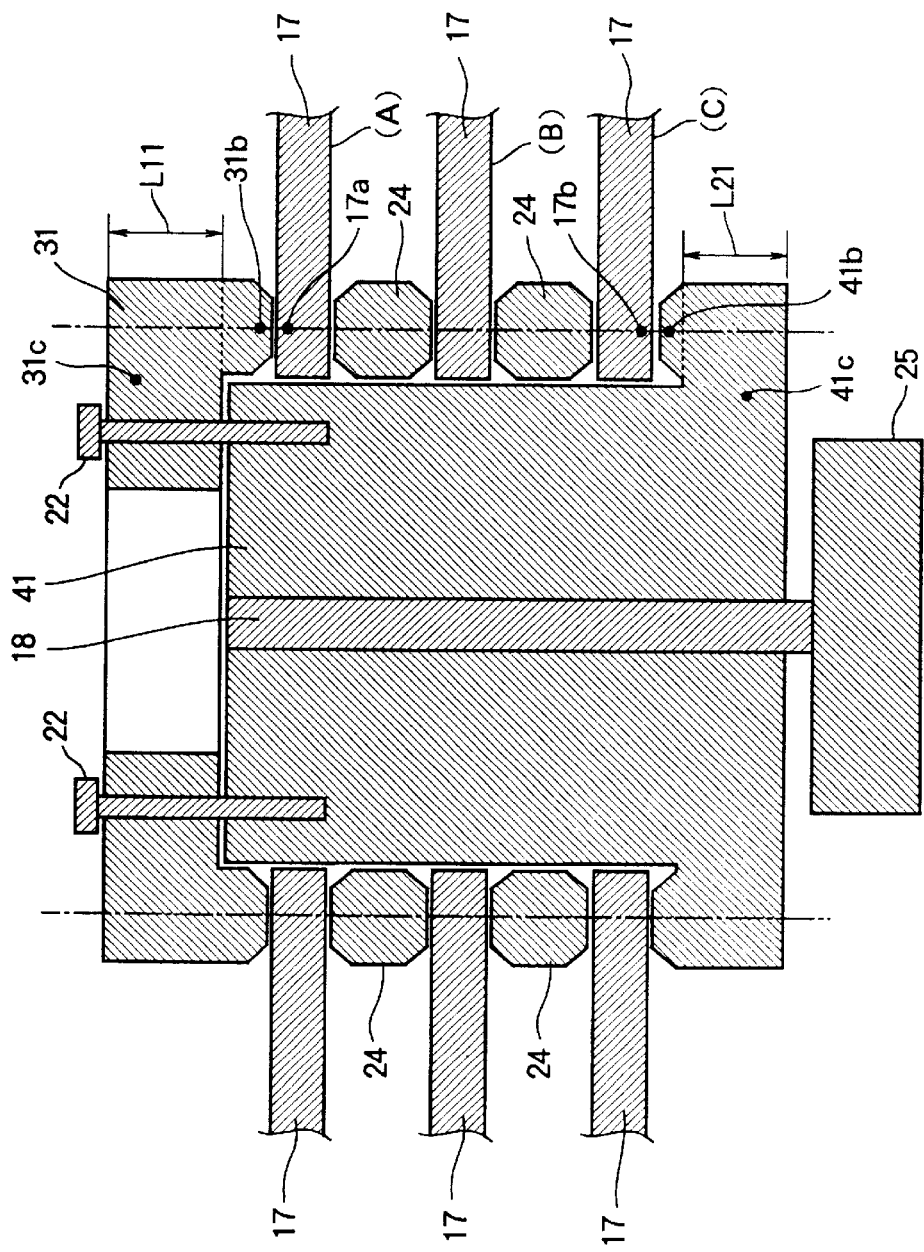
FIG. 5 is a sectional view of the disk clamp of a third embodiment of the invention.

FIG. 5 is a cross-sectional view of the disk clamp of a third embodiment of the present invention. A main difference between the disk clamp of this embodiment shown in FIG. 5 and the disk clamp of the second embodiment shown in FIG. 4 is that the top clamp 31 and hub 41 are not made of stainless steel but made of a titanium material of which thermal expansion coefficient is close to the thermal expansion coefficient of the glass substrate of the recording disk 17. The titanium material used in this embodiment is similar to the titanium material used in the first and second embodiments.

The titanium material is more or less inferior to the stainless steel in terms of coefficient of elasticity, but this inferiority can be made up for by adding an extra thickness as in the first and second embodiments, which were described above.

The top clamp 31 and hub 41 of this embodiment are likely to return to the original positions of contact when the raised temperature returns to room temperature, as in the first and second embodiments, and differences in distance from the screws 22 will not result in such differences that the data position is likely to return to the original position of contact in some locations and is not in some other locations after temperature cycling is conducted, and the data position will evenly return to the original position of contact in any location.

As has been described above, because the top clamp and hub of the disk clamp of this embodiment are made of a titanium material having a thermal expansion coefficient close to that of the glass substrate, the data position in a recording track on the side of the clamp portion 17a on the recording disk 17(A) and on the side of the clamp portion 17b on the recording disk 17(C) can be resistant to positional deviations even after temperature cycling is conducted, and the distribution of data positions can be centered in the vicinity of the center position. Because the distribution of data positions can be centered in the vicinity of the center position, the head will not be moved suddenly, eliminating the danger of unsuccessful data read or write and enabling stable read and write by the head.

Because either the top clamp or the hub at least of the embodiments described above is made of a titanium material having a thermal expansion coefficient close to that of the glass substrate, the data position in a recording track can be resistant to positional deviations, and the distribution of data positions can be centered in the vicinity of the center position, but because the titanium material is inferior to the stainless steel in terms of coefficient of elasticity, the thickness of either the top clamp or the hub at least must be increased in the stacking direction of the recording disks in order to keep a force needed to clamp the recording disks 17 rotating at a high speed. Therefore, the embodiments described above cannot satisfy the recent demands for thinner profiles.

Next, an embodiment with which the data position in a recording track can be resistant to positional deviations, the distribution of data positions can be centered in the vicinity of the center position, and the demands for thinner profile can be satisfied will be described.

Figure 6:
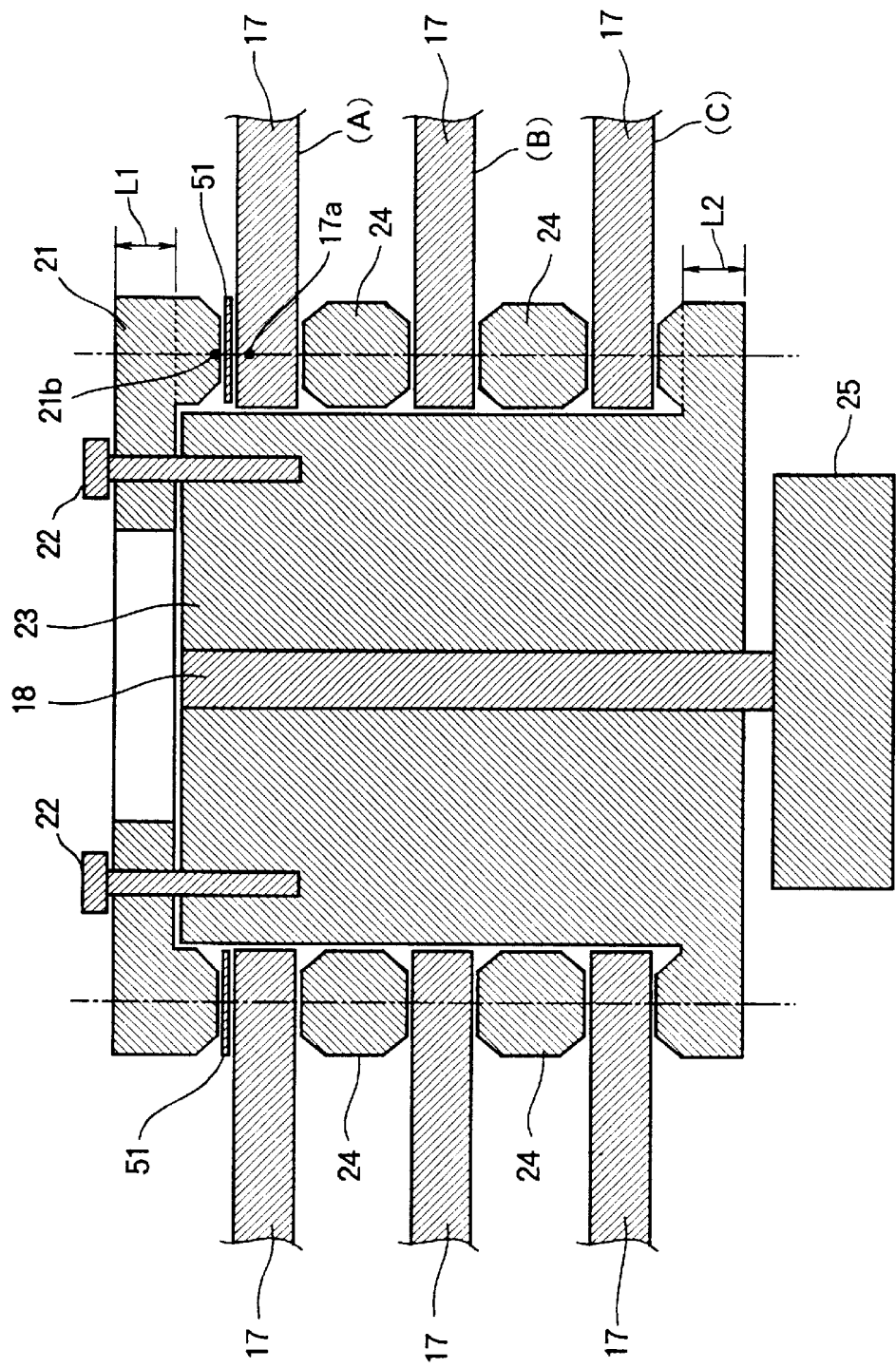
FIG. 6 is a sectional view of the disk clamp of a fourth embodiment of the invention.

FIG. 6 is a cross-sectional view of the disk clamp of a fourth embodiment of the present invention. A main difference between the disk clamp of this embodiment shown in FIG. 6 and the conventional disk clamp shown in FIG. 10 is that the clamp ring 51, which is a ring-shaped thermal strain buffer made of a titanium material of which thermal expansion coefficient is close to the thermal expansion coefficient of the glass substrate of the recording disk 17, is inserted between the perimetric portion 21b of the top clamp 21 and the clamp portion 17a of the recording disk 17(A). The thermal distortion in this case is a strain generated in the glass substrate because the data position on the glass substrate after temperature cycling cannot completely return to its position before temperature cycling, owing to the difference in thermal expansion coefficient between the stainless steel used for the disk clamp and the glass substrate, as described above. In other words, the force returning the data position on the glass substrate to its original position before temperature cycling cannot be used up and develop a strain because the position on the glass substrate clamped by the stainless steel cannot be returned to its original position owing to a displacement caused by thermal expansion. The absorbing member is made of a material of which thermal expansion coefficient is close to that of the glass substrate, is provided in the portion of contact between the glass substrate and the stainless steel disk clamp, and absorbs the thermal distortion as described above by bringing the thermal expansion coefficient closer. The titanium material used in this embodiment is similar to the titanium material used in the first to third embodiments.

Experiments by the inventor have shown that the clamp ring 51 having a thickness of about 0.1 mm produces a sufficient effect as shown in FIG. 7, which will be described later, and the increase in thickness of the disk clamp can be ignored. Therefore, the sufficient thickness of the clamp ring 51 would be 0.2 mm or below, even in consideration of variables and changes in the titanium material. The disk clamp ring is formed by punching a ring out of a thin titanium sheet evenly spread by forging or rolling.

Figure 7A:
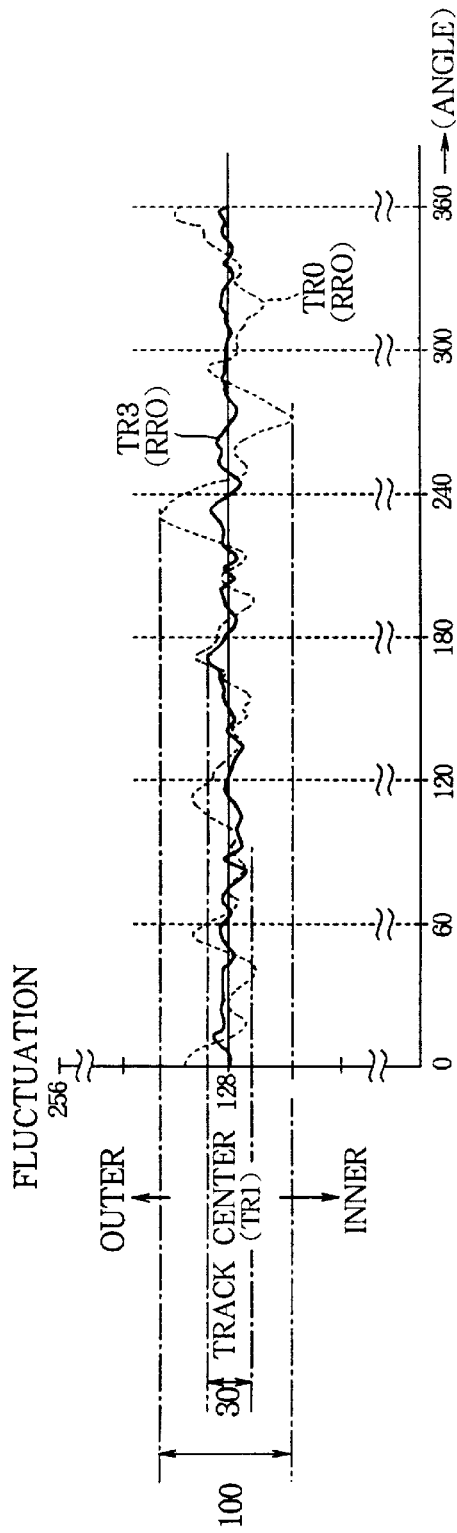
FIG. 7(a) shows a record of fluctuations in data position in a single full recording track after temperature cycling is conducted with the disk clamp having six screws of this embodiment.
Figure 7B:
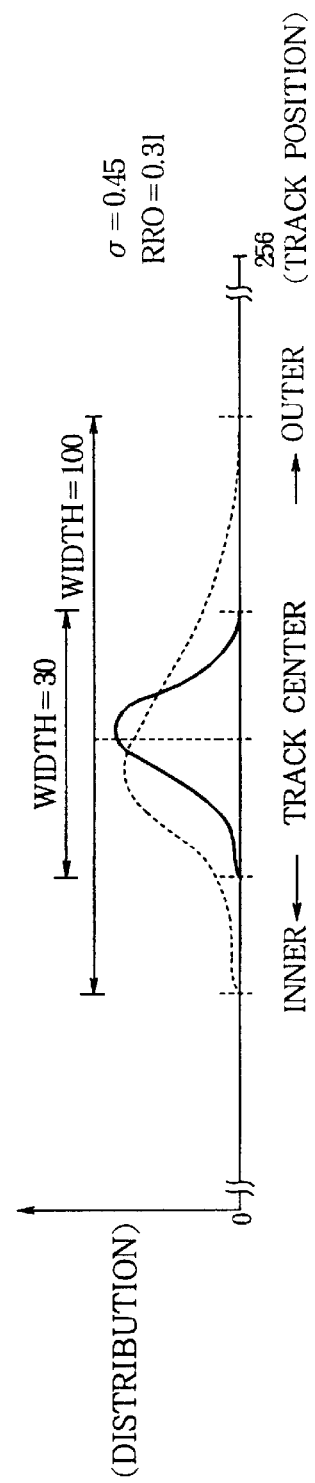
FIG. 7(b) shows the distribution of data positions in a single full recording track shown in FIG. 7(a) within the width of the track.

FIG. 7(a) shows a record of fluctuations in data position of a full recording track like FIG. 12(a), within the width of a single track after temperature cycling is conducted with a disk clamp having six screws 22 of this embodiment. FIG. 7(b) shows the distribution of data positions varying within the width of the track in a single full recording track shown in FIG. 7(a). In FIGS. 7(a) and 7(b), the width of a single track is divided into 256 parts, and the center of the recording track corresponds to the position of 128, as in FIG. 12.

As shown in FIG. 7(a), the data positions of a full recording track after temperature cycling do not have six peaks P1 to P6, which were shown in FIG. 12(a). The peaks P1 to P6 in data position in a recording track after temperature cycling is conducted have been eliminated.

As shown in FIG. 7(b), when the clamp ring of FIG. 7(a) is used, the width of the extension of the data position distribution within a single track divided into 256 parts is reduced to a relative value of 30 from the conventional relative value of 100 shown in FIG. 12(b), and no part largely deviates from the position of 128, which is the track center in a recording track.

In comparison with the values of the conventional disk clamp shown in FIG. 12, the relative standard deviation is about 0.45 and RRO is about 0.31 in FIG. 7(b). Because the relative PES value is reduced from 1 to 0.31, it is confirmed that the deviations in data position in a recording track are reduced, and because the relative value of incident standard deviation is reduced from 1.0 to 0.45, it is confirmed that the distribution of data position is centered in the vicinity of the center position.

FIGS. 7(a) and 7(b) show that because the clamp ring 51 is inserted, the top clamp 21 of this embodiment causes the data position in any location to be uniformly likely to return to the original position of contact when the raised temperature returns to room temperature, as in the first embodiment, and differences in distance from the screws 22 will not result in such differences that the data position is likely to return to the original position of contact in some locations and is not in some other locations after temperature cycling is conducted.

As has been described above, because the disk clamp of this embodiment has the clamp ring 51 made of a titanium material of which thermal expansion coefficient is close to the thermal expansion coefficient of the glass substrate of the recording disk, inserted between the top clamp 21 and the clamp portion 17a of the recording disk 17(A), the data position in a recording track on the side of the clamp portion 17a on the recording disk 17(A) can be resistant to positional deviations even after temperature cycling is conducted, and the distribution of data positions can be centered in the vicinity of the center position. Because the distribution of data positions can be centered in the vicinity of the center position, the head will not be moved suddenly, eliminating the danger of unsuccessful data read or write and enabling stable read and write by the head. The need for increasing the thickness of the disk clamp in order to produce the effects described above has been eliminated.

Figure 8:
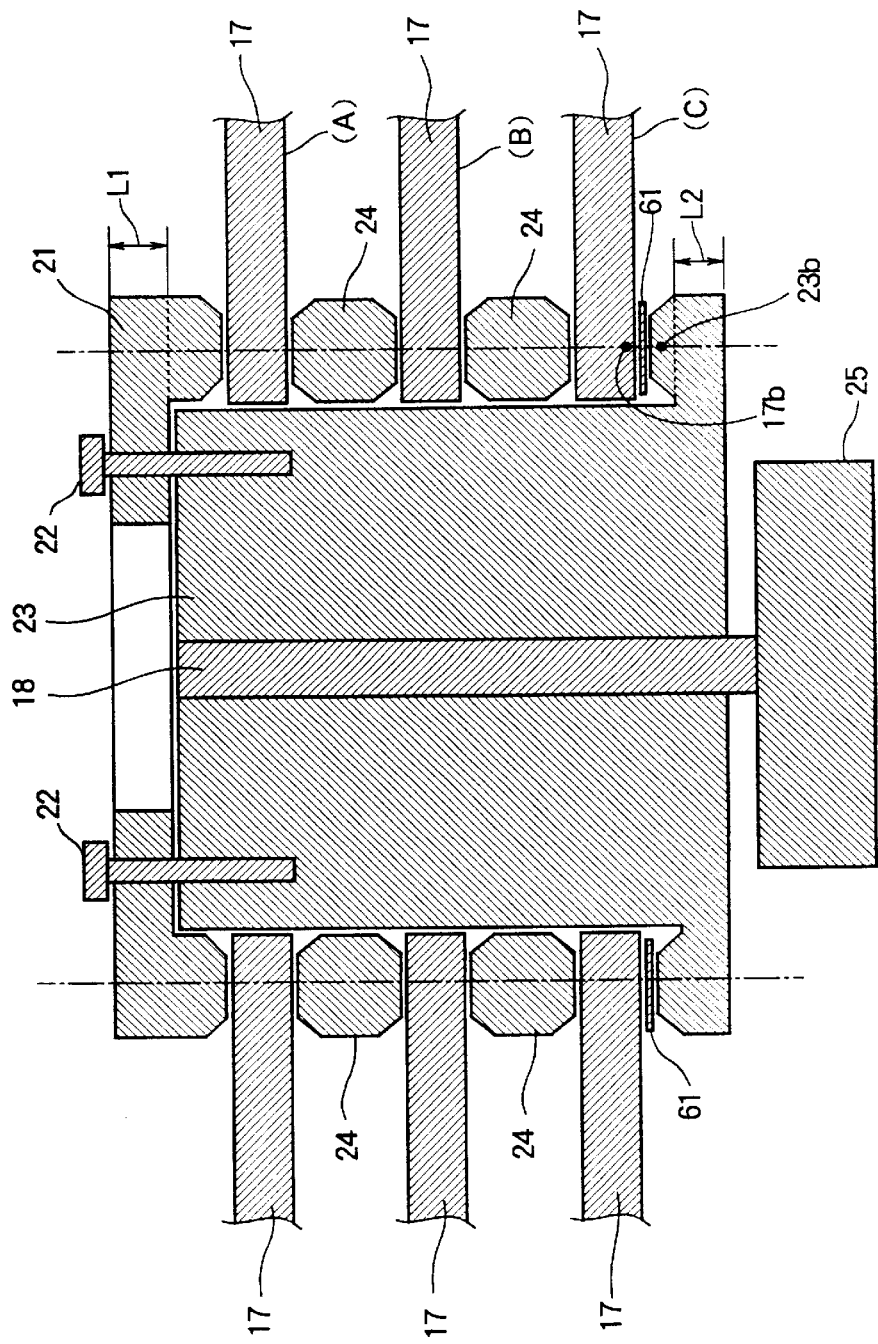
FIG. 8 is a sectional view of the disk clamp of a fifth embodiment of the invention.

FIG. 8 is a cross-sectional view of the disk clamp of a fifth embodiment of the present invention. A main difference between the disk clamp of this embodiment shown in FIG. 8 and the disk clamp of the fourth embodiment shown in FIG. 6 is that the clamp ring 61 is inserted not between the top clamp 21 and the recording disk 17(A) but between the perimetric portion 23b of the hub 23 and the clamp portion 17b of the recording disk 17(C). The titanium material used in this embodiment is similar to the titanium material used in the first to fourth embodiments.

The clamp ring 61 having a thickness of about 0.1 mm, for instance, produces a sufficient effect as in the fourth embodiment, and the increase in thickness of the disk clamp can be ignored. As has been described above, because the disk clamp of this embodiment has the clamp ring 61 made of a titanium material of which thermal expansion coefficient is close to the thermal expansion coefficient of the glass substrate of the recording disk, inserted between the perimetric portion 23b of the hub 23 and the clamp portion 17b of the recording disk (C), the data position in a recording track on the side of the clamp portion 17b on the recording disk 17(C) can be resistant to positional deviations even after temperature cycling is conducted, and the distribution of data positions can be centered in the vicinity of the center position. Because the distribution of data positions can be centered in the vicinity of the center position, the head will not be moved suddenly, eliminating the danger of unsuccessful data read or write and enabling stable read and write by the head. The need for increasing the thickness of the disk clamp in order to produce the effects described above has been eliminated.

Figure 9:
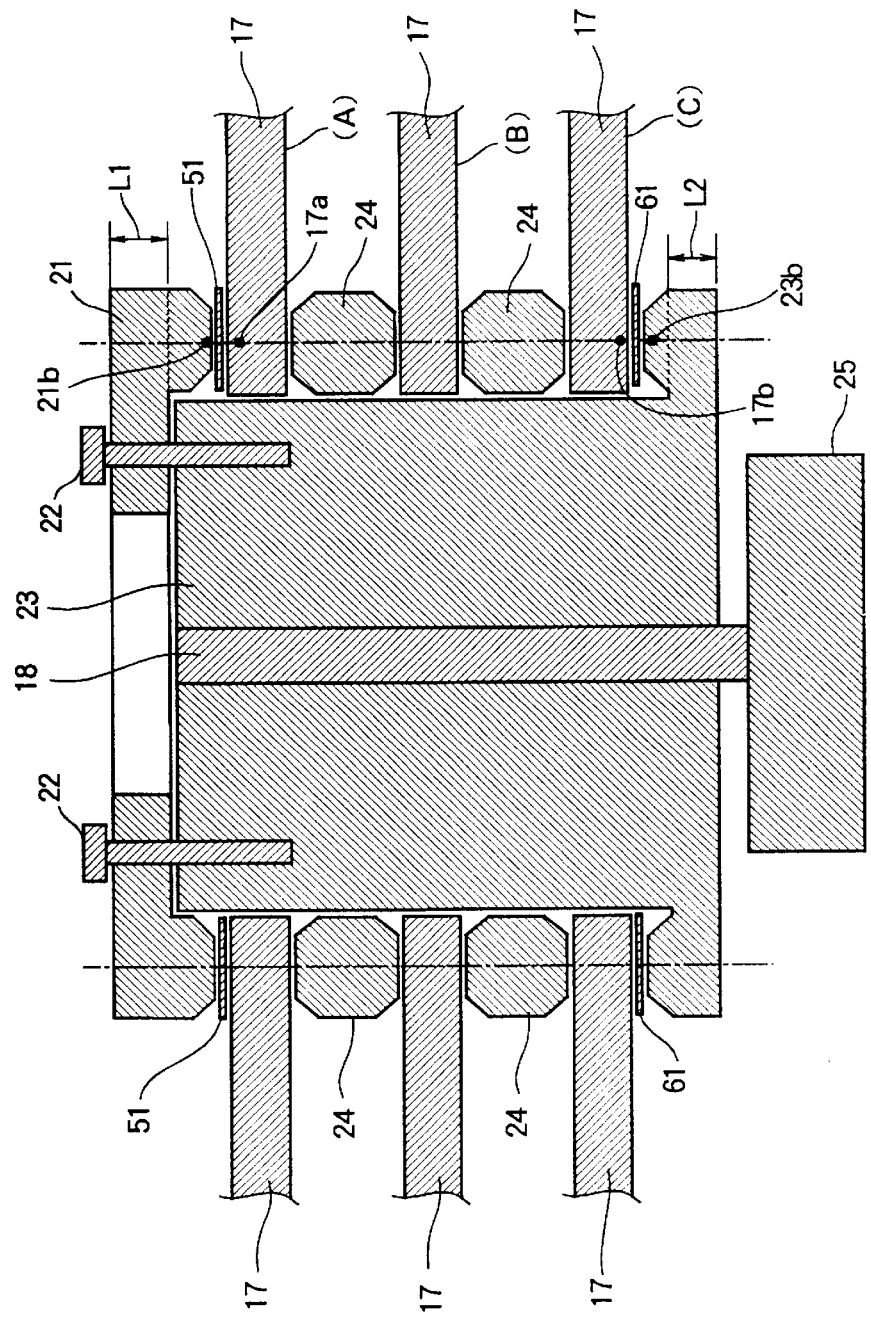
FIG. 9 is a sectional view of the disk clamp of a sixth embodiment of the invention.

FIG. 9 is a cross-sectional view showing the disk clamp of a sixth embodiment of the present invention. A main difference between the disk clamp of this embodiment shown in FIG. 9 and the disk clamp of the fourth embodiment shown in FIG. 6 is that the clamp ring 51 is inserted between the top clamp 21 and the recording disk 17(A) and the clamp ring 61 is also inserted between the perimetric portion 23b of the hub 23 and the clamp portion 17b of the recording disk 17(C). The titanium material used in this embodiment is similar to the titanium material used in the first to fifth embodiments.

The clamp rings 51 and 61 having a thickness of about 0.1 mm, for instance, produce a sufficient effect as in the fourth and fifth embodiment, and the increase in thickness of the disk clamp can be ignored.

As has been described above, because the disk clamp of this embodiment has the clamp ring 51 made of a titanium material of which thermal expansion coefficient is close to the thermal expansion coefficient of the glass substrate of the recording disk, inserted between the top clamp 21 and the clamp portion 17a of the recording disk 17(A) and has the clamp ring 61 made of a titanium material of which thermal expansion coefficient is close to the thermal expansion coefficient of the glass substrate of the recording disk, inserted between the perimetric portion 23b of the hub 23 and the clamp portion 17b of the recording disk (C), the data position in a recording track on the side of the clamp portion 17a on the recording disk 17(A) and on the side of the clamp portion 17b on the recording disk 17(C) can be resistant to positional deviations even after temperature cycling is conducted, and the distribution of data positions can be centered in the vicinity of the center position. Because the distribution of data positions can be centered in the vicinity of the center position, the head will not be moved suddenly, eliminating the danger of unsuccessful data read or write and enabling stable read and write by the head. The need for increasing the thickness of the disk clamp in order to produce the effects described above has been eliminated.

Although the embodiments described above use three recording disks, the present invention is not so limited but is applicable to any case in which more than one recording disk is used. Moreover, although the embodiments described above use six screws, the present invention is not so limited but is applicable to any case in which more than one screw is used.

The shapes of the top clamp and hub are simplified in the embodiments described above, and it is needless to say that the present invention is applicable to more complicated shapes. The hub and top clamp are simplified in the figures of the embodiments described above, but the present invention is applicable even when the connecting portion 31c, 41c, or the like having the geometry of a funnel is formed with the larger end directed toward the recording disk 17 so that the tightening force transfer efficiency can be improved, for instance.

If a titanium material having a thermal expansion coefficient close to that of the glass substrate is used for the top clamp of the disk clamp for disk recording apparatus of the present invention, as described above, the data position in a recording track on the side of the recording disk in contact with the top clamp can be resistant to positional deviations even after temperature cycling is conducted, and the distribution of data positions can be centered in the vicinity of the center position.

If a titanium material having a thermal expansion coefficient close to that of the glass substrate is used for the hub, the data position in a recording track on the side of the recording disk in contact with the hub can be resistant to positional deviations even after temperature cycling is conducted, and the distribution of data positions can be centered in the vicinity of the center position.

If a titanium material having a thermal expansion coefficient close to that of the glass substrate is used for both the top clamp and the hub, the data position in a recording track on the sides of the recording disk in contact with the top clamp and the hub can be resistant to positional deviations even after temperature cycling is conducted, and the distribution of data positions can be centered in the vicinity of the center position.

If a clamp ring made of a titanium material of which thermal expansion coefficient is close to the thermal expansion coefficient of the glass substrate of the recording disk is inserted between the top clamp and the side of the recording disk facing the top clamp, the data position in a recording track on the side of the recording disk facing the top clamp can be resistant to positional deviations even after temperature cycling is conducted, and the distribution of data positions can be centered in the vicinity of the center position.

Because a clamp ring as thin as about 0.1 mm can produce effects, there has been no need for upsizing the disk recording apparatus in order to produce the effects of the present invention.

If a clamp ring made of a titanium material of which thermal expansion coefficient is close to the thermal expansion coefficient of the glass substrate of the recording disk is inserted between the hub and the side of the recording disk facing the hub, the data position in a recording track on the side of the recording disk facing the hub can be resistant to positional deviations even after temperature cycling is conducted, and the distribution of data positions can be centered in the vicinity of the center position.

If clamp rings made of a titanium material of which thermal expansion coefficient is close to the thermal expansion coefficient of the glass substrate of the recording disk are inserted between the top clamp and the side of the recording disk facing the top clamp and between the hub and the side of the recording disk facing the hub, the data position in a recording track on the side of the recording disk facing the top clamp and on the side of the recording disk facing the hub can be resistant to positional deviations even after temperature cycling is conducted, and the distribution of data positions can be centered in the vicinity of the center position.

Because the distribution of data positions can be centered in the vicinity of the center position, the head will not be moved suddenly, eliminating the danger of unsuccessful data read or write and enabling stable read and write by the head.

If the alpha type titanium alloy is used for the disk clamp of the present invention, the cost can be lowered. Especially when pure titanium is use, the cost becomes low.

If the beta type titanium alloy is used, the amounts of variations in expansion coefficient among individual disk clamps can be reduced.

If the alpha+beta type titanium alloy is used, the same effects as produced by the alpha type titanium alloy can be provided because the cost and physical properties of the material are close to those of the alpha type titanium alloy.

What is claimed is:

1. A disk clamp for securing recording disks with circumferential recording tracks on glass substrates to a spindle shaft in an disk recording apparatus, the disk clamp for disk recording apparatus comprising:

a cylindrical hub adapted to be secured to the spindle shaft and having an axis of rotation;

a top clamp for holding a top of the recording disks concentrically disposed on the hub;

screws for securing the top clamp to the hub;

a ring-shaped thermal strain buffer at a portion of contact between an adjacent recording disk and one of the hub and the top clamp, such that the thermal strain buffer is completely axially outboard of the recording disks; wherein the thermal strain buffer is formed from a homogeneous material that is stable in terms of chemical properties over an operating temperature range of the disk recording apparatus, and has a thermal expansion coefficient similar to that of the glass substrates.

2. The disk clamp of claim 1, wherein the material of the thermal strain buffer is titanium.

3. The disk clamp of claim 2, wherein the thermal strain buffer is a ring punched out of a flat titanium sheet and is in a parallel orientation with respect to the recording disks.

4. The disk clamp of claim 2, wherein the titanium is of the alpha type.

5. The disk clamp of claim 2, wherein the titanium is of the beta type.

6. The disk clamp of claim 2, wherein the titanium is of the alpha+beta type.

7. The disk clamp of claim 1, wherein a thickness of the thermal strain buffer is in the range of 0.1 to 0.2 mm, and wherein an outer diameter wall of the hub and inner diameter edges of the recording disks are unobstructed.

8. The disk clamp of claim 1, wherein a ring-shaped spacer formed from a ceramic material having a thermal expansion coefficient similar to that of the glass substrates is located between the glass substrates.

9. The disk clamp of claim 1, further comprising ceramic spacers between adjacent ones of the recording disks; and wherein the ceramic spacers are the only structures located directly between adjacent ones of the recording disks; and the ceramic spacers axially space apart adjacent ones of the recording disks by a first distance, the thermal strain buffer axially spaces apart the top clamp from the adjacent recording disk by a second distance, and the first distance is significantly greater than the second distance.

10. A disk recording apparatus, comprising:

a hub adapted to be secured to a spindle shaft and having an axis of rotation and an outer diameter wall;

recording disks concentrically disposed on the hub and having circumferential recording tracks on glass substrates and inner diameter edges;

a clamp mounted to the hub axially outboard of the recording disks far retaining the recording disks on the hub;

a thermal strain buffer located between the clamp and the recording disks, the thermal strain buffer being completely axially outboard of the recording disks and in a parallel orientation with respect to the recording disks;

the thermal strain buffer being formed from a single, homogenous, flat sheet of material, having an axial thickness in a range of 0.1 to 0.2 mm, that is stable in terms of chemical properties aver an operating temperature range of the disk recording apparatus, and has a thermal expansion coefficient similar to that of the glass substrates; and other ones of the recording disks are spaced apart by an axial distance that is much greater than the axial thickness of the thermal strain buffer.

11. The disk recording apparatus of claim 10, wherein the thermal strain buffer is formed from titanium.

12. The disk recording apparatus of claim 10, wherein the outer diameter wall of the hub and the inner diameter edges of the recording disks are unobstructed.

13. The disk recording apparatus of claim 10, further comprising ceramic spacers between adjacent ones of the recording disks; and wherein the ceramic spacers are the only structures located directly between adjacent ones of the recording disks.

14. A disk recording apparatus, comprising:

a hub adapted to be secured to a spindle shall and having an axis of rotation and an outer diameter wall;

recording disks concentrically disposed on the hub and having circumferential recording tracks on glass substrates and inner diameter edges, the outer diameter wall of the hub and the inner diameter edges of the recording disks being unobstructed;

a clamp mounted to the hub axially outboard of the recording discs for retaining the recording disks on the hub;

a thermal strain buffer located between the clamp and an adjacent recording disk, the thermal strain buffer being completely axially outboard of the recording disks and in a parallel orientation with respect to the recording disks;

ceramic spacers between adjacent ones of the recording disks, such that the ceramic spacers are the only structures located directly between adjacent ones of the recording disks;

the thermal strain buffer being fromed from a single, homogenous, flat sheet of titanium material having a thickness in a range of 0.1 to 0.2 mm, that is stable in terms of chemical properties over an operating temperature range of the disk recording apparatus, and has a thermal expansion coefficient similar to that of the glass substrates; and the ceramic spacers axially space apart said adjacent ones of the recording disks by a first distance, the thermal strain buffer axially spaces apart the clamp from the adjacent recording disk by a second distance, and the first distance is significantly greater than the second distance.

* * * * *

UNITED STATES PATENT AND TRADEMARK OFFICE
CERTIFICATE OF CORRECTION

PATENT NO. : 6,785,090 B2
DATED : August 31, 2004
INVENTOR(S) : Koyanagi et al.

It is certified that error appears in the above-identified patent and that said Letters Patent is hereby corrected as shown below:

Column 15,
Line 3, please replace the word "an" between the words "in" and "disk" with the word -- a --.
Line 24, please insert the word -- titanium -- between the words "homogeneous" and "material".

Column 16,
Line 9, please insert the word -- titanium -- between the words "of" and "material".
Line 11, please replace the word "aver" between the words "properties" and "an" with the word -- over --.
Line 29, please replace the word "shall" between the words "spindle" and "and" with the word -- shaft --.
Line 48, please replace the word "fromed" between the words "being" and "from" with the word -- formed --.

Signed and Sealed this

Twenty-eighth Day of December, 2004

JON W. DUDAS
*Director of the United States Patent and Trademark Office*